March 19, 1946. T. H. KRUEGER Re. 22,732

STRIP SERVING MACHINE

Original Filed Aug. 8, 1942

INVENTOR
THEODORE H. KRUEGER
BY
Moses & Nolte
ATTORNEYS

Reissued Mar. 19, 1946

Re. 22,732

UNITED STATES PATENT OFFICE 22,732

STRIP SERVING MACHINE

Theodore H. Krueger, Stratford, Conn., assignor to Better Packages Incorporated, a corporation of New York Original No. 2,362,640, dated November 14, 1944, Serial No. 454,153, August 8, 1942. Application for reissue November 13, 1945, Serial No. 628,345

25 Claims. (Cl. 164—84.5)

This invention relates to an improved apparatus for serving measured lengths of strips or tape which are covered or impregnated on one side thereof with a pressure sensitive adhesive usually tacky or non-drying either permanently or during the period of use. The invention has particular utility in the various fields of use to which pressure sensitive adhesive tape is applied and especially is useful where the tape is required in short lengths such as fractional parts of a foot. It eliminates the tedious nuisance and waste involved in cutting inaccurate lengths with ordinary scissors and provides a simple and easy operating mechanism for speedily stripping from the roll, measuring, cutting and delivering at a point ready for use, the desired length of tape.

The improved apparatus contemplates mechanical means for stripping the material or tape from the roll in predetermined lengths and comprises generally a compact serving apparatus particularly designed to be carried in the pocket of the user and when in use, to be held in one hand of the user while tape is being drawn by the other hand from the device. In general the mechanism includes a fixed mounting for a roll of tape and a pivotally mounted measuring element adapted to engage the non-tacky or untreated surface of the tape, to be grasped simultaneously with the leading end of the tape, and to be moved about its pivot in a direction away from the roll to draw tape from the roll for a predetermined distance whereby a predetermined length of tape is drawn from the roll. Means are provided for releasing the pivoted element at the end of its arc of movement and for returning it to its original position as well as means for severing the tape which means may be associated with the element. Also are provided means for varying the arc of movement of the element about its pivot so that the lengh of tape delivered may be varied.

It is an object of the invention to provide a pocket size delivery apparatus for tacky tape particularly adapted for speedy and convenient serving of small strips of relatively narrow tacky material although it will be of course understood that while the size of the construction is a feature, the invention is not to be limited to this feature and the dispenser or the principles of the invention involved therein may suitably be applied to the delivery of larger strips of wider web material.

It is a further object of the invention to provide a pull-out dispenser for tacky tape having a support for the leading or free end of the tape against which rests the non-tacky side of the tape and which is of such a nature as to permit the finger of the operator to be applied to the tacky side of the leading end of the tape in an endwise direction so that the tap is drawn out in line with the axis of the finger. Thus the cut off piece of tape adheres to the finger in endwise alignment with the finger so as to be readily applicable to the surface to which the tape is to be applied. The edge of the tape supporting member may provide a tear-off edge for tearing off the free end of the tape while adhered to the finger. Also mounted adjacent to the support for the leading end of the tape an adhesion member is provided to which the tacky side of the tape adheres and is thereby held in position adjacent to the tape end support.

Further objects and advantages will appear from the following description and the drawing in which.

Figure 1:
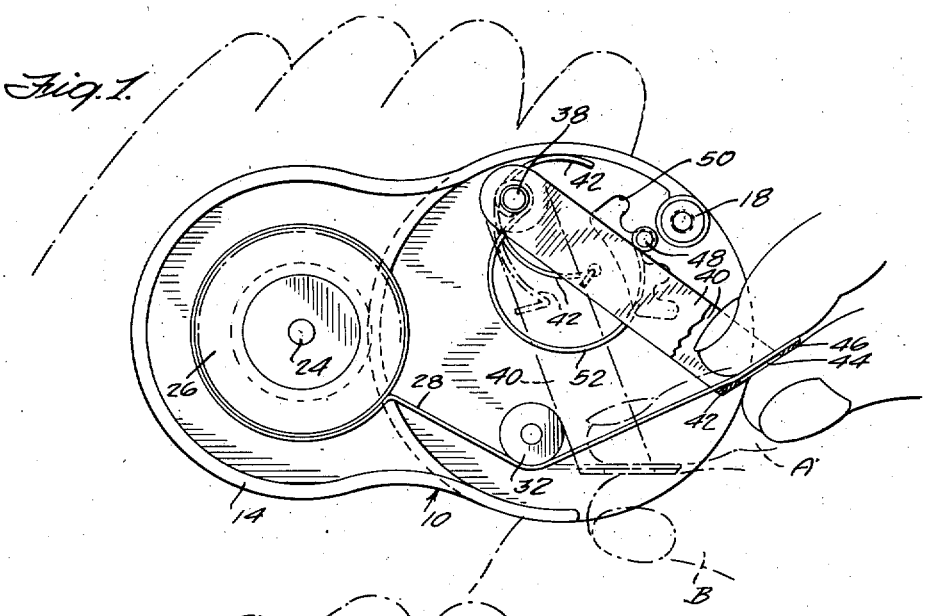
Figure 1 is a side elevation of the device with one side wall removed showing the tape delivery apparatus, the device being shown held in the hand of the user with the other hand of the user in the act of withdrawing a strip of tape.

Referring now to the drawing, the device includes an outside casing 10 which may be of metal, plastic or any other convenient relatively durable material, such a material as Bakelite having been found particularly advantageous. The case 10 is preferably formed of two interlocked frame members 12 and 14, each of which has the end toward the tape delivering portion of the machine open. Interlocking of the side flanges of the frame members at the rear of the device is preferably accomplished by the flange 16 which keys with the edge of the portion 14. The two case members are held together at the front portion of the machine by the lock post 18. Obviously any other convenient means desired may be employed as a covering for the apparatus, it only being necessary that sufficient rigidity for mounting of the various parts be provided.

Figure 2:
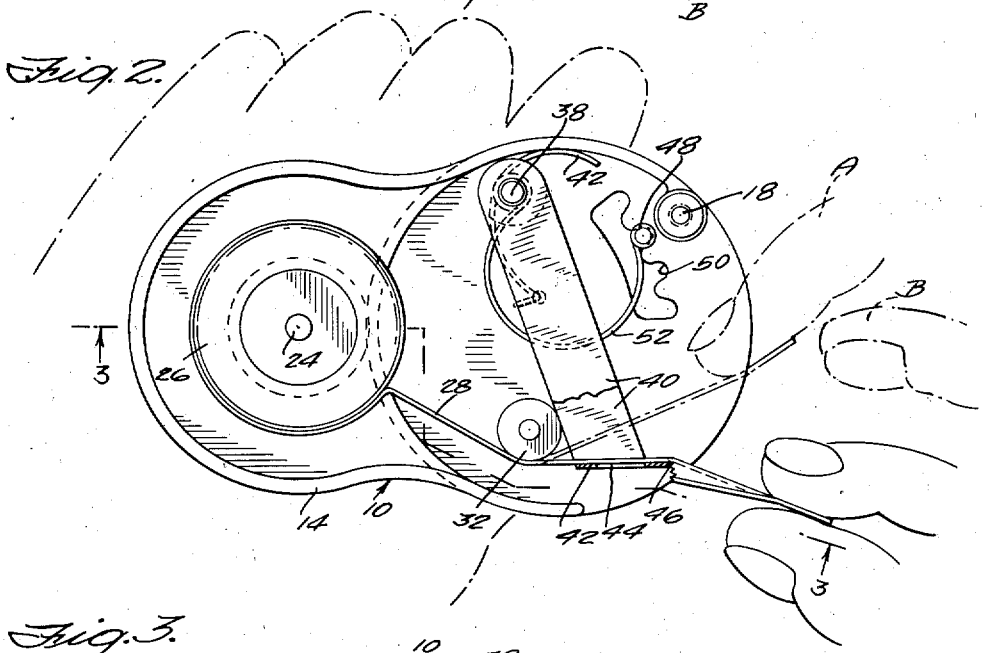
Figure 2 is a view similar to Figure 1 showing a further step in the removal of a strip of tape.
Figure 3:
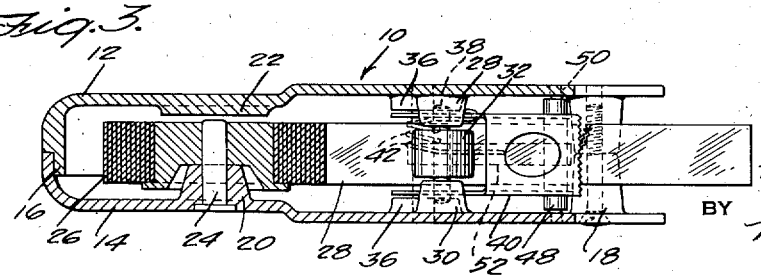
Figure 3 is a vertical longitudinal section taken on the line 3—3 of Figure 2.

The portion 14 is provided with the inwardly extending boss 20 and the portion 12 is similarly provided with a complementary boss 22 which have mounted between them the shaft 24 upon which the roll 26 of strip material 28 may conveniently be mounted. The interior of the casing is also provided forwardly of the mounting of the roll 26 with complementary bosses 28 and 30 which mount between them the tape guide roller 32. Similarly interiorly mounted bosses 34 and 36 carry pivot 38 upon which is pivotally mounted tape delivery element or yoke 40 which is normally spring pressed by spring 42 into the rearward position shown in Figure 2. As illustrated in Figure 3, the yoke 40 includes side members descending downwardly from the pivot 38 and a base member 42 which joins the side members, and constitutes a support for the leading end of the tape. The base 42 is preferably apertured as at 44 and also extends forwardly of the side members of the yoke terminating in a cutting edge 46 which may be serrated to facilitate cutting if desired.

The forward movement of the yoke 40 about the pivot 38 is limited by a pin 48. Each of the walls 12 and 14 are provided as shown in Figures 2 and 3 with toothed apertures 50 which may be cut through the walls as shown. The pin 48 may fit into the recesses between the teeth in the aperture 50 and will be held in position in whatever recess it is placed by the spring 52. It can be seen therefore that the pin 48 may be placed in any of the four recesses shown and it will be understood of course that any number of recesses may be provided and thus the length of travel of the yoke 40 from its rearmost position against the roller 32 forwardly, will be determined.

The operation of the device is as follows: The length of strip desired is first set by positioning the pin 48. The thumb and forefinger are then inserted into the device on either side of the base member 42 so that when the thumb and forefinger grasp the tape and the yoke, the forefinger A contacts the tacky side of the tape and the thumb B contacts the yoke and the untreated or non-tacky side of the tape through aperture 44. The yoke and the web are now drawn forward to the forward position illustrated in Figure 1 until the yoke 40 meets the pin 48 at which time the yoke can travel no further. The thumb B is now momentarily released as illustrated in Figure 2 and the yoke 40 under the influence of spring 42 moved backward against the guide roll 32, the drawn portion of the web remaining adhered to the forefinger A. The thumb is now placed back against the tape again and the tape drawn down as shown in Figure 2 against the cutting edge 46 where the delivered portion of tape is easily severed. The apparatus is now ready for delivery of a second piece of tape by grasping the portion 42 of the yoke 40 as heretofore described.

It will be observed that the tape roller 32 constitutes an adhesion member to which the tape adheres near its end, while the machine is idle between successive operations. This adhesion roller thus supports the leading end of the tape and holds it in position adjacent to the base member or tape supporting plate 42 which supports the end of the tape ready to be grasped for the next dispensing operation. In the example of the invention shown the end of the tape is held so that its non-adhesive side is adjacent to the member 42, and such end projects beyond the adhesion roller 32 sufficiently to permit the end of the finger to be applied to the adhesive on such projecting end for drawing out the tape. It is furthermore to be observed that the finger is applied in a lengthwise direction so that the end of the tape sticks to the finger lengthwise and in line of the finger. When the tape is torn off it therefore projects endwise from the finger and is in the most convenient position for application to the package or other article upon which the tape is to be used.

While I have illustrated and described in detail certain forms of my invention, I do not wish to be understood as limiting myself to the use of such forms, as I realize that changes within the scope of the invention are possible, and I further intend each element or instrumentality recited in any of the following claims to be understood to refer to all equivalent elements or instrumentalities for accomplishing substantially the same result in substantially the same or equivalent manner, it being my purpose to cover my invention broadly in whatever form its principle may be utilized.

I claim:

1. An apparatus for dispensing measured strips of tape having a support for a supply of the tape, a pivotally mounted measuring element, a back stop and means to urge said element normally against said back stop, said element being mounted to be grasped simultaneously with the leading end of the tape whereby tape may be drawn from the roll while advancing said element about its pivotal mounting, a stop limiting the forward movement of said element about its pivot, and means on said element to sever the thus delivered strip after said element has returned to its normal position against the back stop.

2. In a device for dispensing tacky tape, a pivoted yoke measuring element having a tape engaging zone and an aperture in said zone and guide means to direct the leading end of the tape past said zone with the non-tacky side of tape against said zone.

3. A pocket strip dispensing apparatus adapted to be held, when operated, in the palm of the hand of the operator, said apparatus having means to support a supply of tape, a pivoted yoke measuring element, means to direct the leading end of the tape past said yoke and an opening in said device admitting the finger and thumb of the operator to grasp said yoke and said tape simultaneously to draw tape from the supply.

4. A device as claimed in claim 3 having an adjustable stop limiting the extent to which said yoke may be moved.

5. A device as claimed in claim 3 including severing means forming a portion of said yoke.

6. A pocket strip dispensing apparatus of a size adapted to be held in the palm of a hand, said apparatus comprising a covering frame having substantially parallel walls, a closed and a partially open end, means in the casing upon which a supply of tape may be mounted and measuring and severing means adjacent said open end, the opening in said open end being of sufficient size to permit the introduction of at least one finger of the operator to contact the tape and withdraw the same through the opening.

7. A pocket strip dispensing apparatus adapted to be operated when held in the palm of the hand of the operator including an outside casing having substantially parallel walls, a closed end and a partially open end, means in the casing upon which a supply of tape may be mounted, a yoke member pivotally mounted between said walls adjacent said open end, means to direct the leading end of the tape past the end of said yoke member remote from said pivot, means to move the end of said yoke member through a predetermined arc through said opening while drawing tape from the supply, said arc terminating outside of said frame member, and means on said yoke member remote from said pivotal mounting for severing a withdrawn strip.

8. In a device for dispensing tacky tape, a support for a supply of tape to be fed, a pivoted measuring element having a tape engaging portion and guide means to direct the leading end of the tape past said tape engaging portion with the non-tacky side of the tape facing said portion.

9. A tape dispensing apparatus having means to support a supply of tape, a measuring element mounted for limited movement towards and from the supply of tape, and having a tape supporting part mounted to move edgewise in the general direction in which the tape is fed, means for limiting the movement of said element in said direction, said tape supporting part being of such dimensions that it may be grasped between the fingers of the hand with the tape supported thereon and manually drawn out with the tape to measure and limit the length of tape withdrawn, and a severing means movable with said part against which the tape may be severed when the tape supporting part is in its position nearest to the tape supply.

10. An apparatus as claimed in claim 9 in which the severing means constitutes the edge of said tape supporting part.

11. An apparatus as claimed in claim 9 having spring means for returning the tape supporting part to its position nearest to a tape supply.

12. A tape dispensing apparatus having means to support a supply of tape, a measuring element comprising a swinging arm carrying a tape supporting part at the outer end thereof movable towards and from the supply of tape in the general direction in which the tape is fed, means for limiting movement of said element in said direction, said tape supporting part being of such dimensions that it may be grasped by the fingers of the hand with the tape supported thereon, and manually drawn out with the tape to measure and limit the length of tape withdrawn, and a severing means against which the tape may be severed when the tape supporting part is in its position nearest to the tape supply.

13. In a device for dispensing tacky tape, a support for a supply of tape to be fed, a measuring element mounted for limited movement in a direction towards and from the supply of tape, said measuring element having a tape supporting surface of such size that it may be grasped between the fingers together with the end of the tacky tape resting thereon, the edge of said tape supporting surface constituting tape tear-off means, and guide means to direct the leading end of the tape into a position adjacent to said tape supporting surface with the non-tacky side of the tape facing said surface.

14. A device as claimed in claim 13 in which a spring is provided for returning the measuring element to its position nearest to the source of tape supply.

15. A machine for delivering strips of tacky material having a support for a supply of material, an apertured reciprocating feed element, means to guide the leading end of the tape through said element and then into substantially the path of its movement, a knife to sever a delivered strip, said knife being mounted to provide a leading end of tape extending beyond the end of said feed element whereby the finger of the operator will encounter said leading end.

16. A machine for delivering strips of tacky material including a support for a supply of the material, a reciprocating feed element mounted for reciprocal movement in a direction at an angle to the plane of the tape web as it is drawn from the supply, means to place and maintain the leading end of the tape adjacent to the feed element in the direction of movement of said element and means on the feed element permitting simultaneous grasping of the feed element and the leading end of the tape.

17. A device for serving strips of tacky material including a support for a roll of tape, a reciprocating measuring element mounted for reciprocal movement in the direction of feed of the tape, guide means for guiding the leading end of the tape into a position adjacent to a tape engaging surface of the reciprocating measuring element, said element being formed to permit it to be grasped together with the leading end of the tape with the fingers of one hand, so that the tape is pressed against the tape engaging surface of the reciprocating element and the tape and element may be simultaneously drawn from the machine by the fingers, and means whereby the measuring element is automatically returned to its initial position as soon as released.

18. A device for serving strips of tacky material including a support for a roll of tape, a reciprocating measuring element mounted for reciprocal movement in the direction of feed of the tape, guide means for guiding the leading end of the tape into a position adjacent to a tape engaging surface of the reciprocating measuring element, said element being formed to permit it to be grasped together with the leading end of the tape with the fingers of one hand, with the axis of the finger engaging the tacky side of tape extending in the general direction of the length of the tape in which direction the tape is pulled to withdraw the same and so that the tape is pressed against the tape engaging surface of the reciprocating element and the tape and element may be simultaneously drawn from the machine by the fingers, and means whereby the measuring element is automatically returned to its initial position as soon as released.

19. In a pull-out dispenser for tacky tape, a support for a supply of tape to be fed, a movable measuring element having a tape engaging portion, and an adhesion roller engaging the tacky side of the tape to direct the leading end of the tape adjacent to said tape engaging portion with the nontacky side of the tape facing said portion, said adhesion roller serving to hold the leading end of the tape in position by adhesion of the tape thereto.

20. In a pull-out dispenser for tacky tape, a support for a roll of tape to be dispensed, an adhesion roller in contact with which the tape passes when pulled from the roll of tape, said adhesion roller engaging the tacky side of the tape, a measuring element mounted for limited movement towards and from the adhesion roller, said measuring element having a tape engaging surface at the opposite side of the tape path from the adhesion roller, the end of the tape engaging surface projecting beyond the adhesion roller a sufficient distance to permit the end of the operator's finger to be applied to the adhesive surface of the leading end of the tape for the purpose of pulling out the tape, said support for the leading end of the tape terminating in a tear-off edge.

21. In a pull-out dispenser for tacky tape, a support for a roll of tape to be dispensed, a support for the leading end of the tape having a tape engaging surface over which the tape is adapted to be pulled with the nontacky side of the tape facing said surface, and an adhesion member mounted adjacent said tape engaging surface at the opposite side of the tape path therefrom and in position to adhere to the tacky side of the tape and thereby hold the leading end of the tape in position, the end of the tape engaging surface projecting beyond the adhesion member a distance sufficient to permit the end of the operator's finger to be applied to the adhesive surface of the leading end of the tape for the purpose of pulling out the tape.

22. In a pull-out dispenser for tacky tape, a support for a roll of tape to be dispensed, a support for the leading end of the tape having a tape engaging surface, and an adhesion roller adjacent the receiving end of the tape end support, said adhesion roller serving by engagement with the tacky side of the tape to retain the leading end of the tape in proximity to the tape end support with the nontacky side of the tape facing the tape engaging surface thereof.

23. In a pull-out dispenser for tacky tape, a support for a roll of tape to be dispensed, a support for the leading end of the tape having a tape engaging surface, an adhesion roller adjacent the tape engaging surface, said adhesion roller serving by engagement with the tacky side of the tape to retain the leading end of the idle tape in proximity to the tape engaging surface where it can be conveniently engaged on its tacky face by a finger of the operator and pulled out, and a tape tear-off edge at the delivery end of the tape engaging surface.

24. In a pull-out dispenser for tacky tape, a support for a roll of tape to be dispensed, a support for the leading end of the tape having a tape engaging surface, an adhesion roller adjacent the receiving end of the tape engaging surface, said adhesion roller serving by engagement with the tacky side of the tape to retain the leading end of the idle tape in proximity to the tape engaging surface where it can be conveniently engaged on its tacky face by a finger of the operator disposed lengthwise of the tape and pulled out.

25. In a pull-out dispenser for tacky tape, a support for a roll of tape to be dispensed, an adhesion roller in contact with which the tape passes from the supply roll, the adhesive surface of the tape engaging and adhering to said adhesion roller, and a tape supporting plate for supporting the leading end of the tape with the nonadhesive side of the tape facing said plate, said plate extending a short distance beyond the adhesion roller and projecting sufficiently to permit the thumb and finger of the operator to embrace said plate and the leading end of the tape with one of said digits contacting the adhesive surface of the leading end of the tape for the purpose of pulling out the tape.

THEODORE H. KRUEGER.